(12) United States Patent
Tjong et al.

(10) Patent No.: US 11,868,668 B2
(45) Date of Patent: *Jan. 9, 2024

(54) SECURE DEVICE ENDPOINT ASSIGNMENT AND JOB COMMUNICATION

(71) Applicant: Microsoft Technology Licensing, LLC, Redmond, WA (US)

(72) Inventors: Soemin Tjong, Bellevue, WA (US); Jimmy Yu Wu, Bellevue, WA (US); Kristofer N. Iverson, Seattle, WA (US); Jorge I. Raastroem, Kenmore, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/586,129

(22) Filed: Jan. 27, 2022

(65) Prior Publication Data

US 2022/0147290 A1 May 12, 2022

Related U.S. Application Data

(63) Continuation of application No. 16/368,564, filed on Mar. 28, 2019, now Pat. No. 11,294,609.

(51) Int. Cl.
*G06F 3/12* (2006.01)
*H04N 1/44* (2006.01)

(52) U.S. Cl.
CPC .......... *G06F 3/1231* (2013.01); *G06F 3/1207* (2013.01); *G06F 3/1222* (2013.01);
(Continued)

(58) Field of Classification Search
None
See application file for complete search history.

(56) References Cited

U.S. PATENT DOCUMENTS 6,452,692 B1 * 9/2002 Yacoub ................. G06F 3/1288
358/1.15
2007/0067321 A1 * 3/2007 Bissett .................. G06F 9/4488
(Continued)

OTHER PUBLICATIONS

"International Search Report and Written Opinion Issued in PCT Application No. PCT/US20/023472", dated Jun. 17, 2020, 12 Pages.
(Continued)

*Primary Examiner* — Miya J Cato
*Assistant Examiner* — Pawan Dhingra
(74) *Attorney, Agent, or Firm* — Newport IP, LLC; Jacob P. Rohwer

(57) ABSTRACT

A device endpoint is accessed through an off-premise communications network relative to the device endpoint. The device endpoint is registered to a virtual device object in data storage of a device service, the device service and the device endpoint communicating across the off-premise communications network, the virtual device object storing a secure device endpoint identifier of the device endpoint. A virtual device identifier associated with the secure device endpoint identifier of the device endpoint is stored in the virtual device object. A request to access the device endpoint using the virtual device identifier is received. The secure device endpoint identifier associated with the virtual device identifier in the virtual device object is read. The device endpoint is notified of a pending job associated with the secure device endpoint identifier. The pending job is communicated to the device endpoint identified by the secure device endpoint identifier.

11 Claims, 9 Drawing Sheets

(52) U.S. Cl.
CPC .......... *G06F 3/1238* (2013.01); *G06F 3/1259* (2013.01); *G06F 3/1261* (2013.01); *H04N 1/4426* (2013.01); *G06F 3/1288* (2013.01)

(56) References Cited

U.S. PATENT DOCUMENTS

| | | | |
|---|---|---|---|
| 2011/0242569 A1 | 10/2011 | Ohara | |
| 2014/0168685 A1* | 6/2014 | St. Laurent | G06F 3/1285 358/1.14 |
| 2014/0253962 A1* | 9/2014 | Neville | H04N 1/00127 358/1.15 |
| 2014/0368859 A1* | 12/2014 | Gutnik | G06F 3/1288 358/1.14 |
| 2015/0294203 A1 | 10/2015 | Sanuki | |
| 2017/0039007 A1* | 2/2017 | Nathani | G06F 21/608 |
| 2020/0142656 A1* | 5/2020 | Seo | G06F 3/1288 |
| 2020/0233619 A1 | 7/2020 | Hosoda | |
| 2020/0310698 A1* | 10/2020 | Gardner | G06F 3/1261 |
| 2020/0310710 A1* | 10/2020 | Tjong | G06F 3/1287 |

OTHER PUBLICATIONS

"International Search Report and Written Opinion Issued in PCT Application No. PCT/US2020/023473", dated Jul. 8, 2020, 10 Pages.

Non Final Office Action Issued in U.S. Appl. No. 16/368,576, dated Dec. 8, 2020, 12 Pages.

Non Final Office Action Issued in U.S. Appl. No. 16/368,564, dated Dec. 10, 2020, 16 Pages.

"Final Office Action Issued in U.S. Appl. No. 16/368,576", dated May 3, 2021, 15 Pages.

"Final Office Action Issued in U.S. Appl. No. 16/368,564", dated Jun. 18, 2021, 18 Pages.

Non Final Office Action Issued in U.S. Appl. No. 16/368,576, dated Jul. 9, 2021, 15 Pages.

"Final Office Action Issued in U.S. Appl. No. 16/368,576", dated Dec. 15, 2021, 16 Pages.

"Non Final Office Action Issued in U.S. Appl. No. 16/368,576", dated Mar. 24, 2022, 10 Pages.

"Office Action Issued in European Patent Application No. 20720566.7", dated Jul. 18, 2023, 7 Pages.

Lenovo, "Secure Printing", Published in IP.com Prior Art Database, Sep. 26, 2006, 2 Pages.

* cited by examiner

SECURE DEVICE ENDPOINT ASSIGNMENT AND JOB COMMUNICATION

CROSS-REFERENCE TO RELATED APPLICATIONS

The present application claims benefit of priority to U.S. patent application Ser. No. 16/368,564, entitled "Secure Device Endpoint Assignment" and filed Mar. 28, 2019 which is specifically incorporated by reference for all that it discloses and teaches.

This application is related by subject matter to U.S. patent application Ser. No. 16/368,576 entitled "Delayed Printer Assignment", which is specifically incorporated herein by reference for all that it discloses and teaches.

BACKGROUND

"Cloud computing" refers to access to computing resources and data via a network infrastructure, such as the Internet. The computing resources and data storage may be provided by linked data centers in the "cloud." Each of the data centers may include many servers that provide computing resources and data storage/retrieval capabilities. Users of cloud computing generally do not need knowledge regarding or control over the underlying data center infrastructure of the "cloud." Instead, the users may access the computing resources and data storage capabilities on an as-needed basis.

SUMMARY

The described technology addresses such limitations by accessing a device endpoint through an off-premise communications network relative to the device endpoint. The device endpoint is registered to a virtual device object in data storage of a device service, the device service and the device endpoint communicating across the off-premise communications network, the virtual device object storing a secure device endpoint identifier of the device endpoint. A virtual device identifier associated with the secure device endpoint identifier of the device endpoint is stored in the virtual device object. A request to access the device endpoint using the virtual device identifier is received. The secure device endpoint identifier associated with the virtual device identifier in the virtual device object is read. The device endpoint is notified of a pending job associated with the secure device endpoint identifier. The pending job is communicated to the device endpoint identified by the secure device endpoint identifier.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTIONS

Cloud computing offers opportunities to allow secure user access to device endpoints and services inside and outside the user's local computer or network. As such, on-premise device management can be upgraded to cloud-based device management using cloud-based services and directories. For example, physical printers can be connected to cloud-based print services and can be securely accessed by authorized users from anywhere with Internet connectivity. In this context, such physical devices and device-based services termed "device endpoints," process device-based jobs over an off-premise communication network. For example, a physical printer or a printer service (e.g., business-to-business) are forms of printer endpoints, which can execute print jobs responsive to user print requests over an off-premise network. Device services need not result in execution of a job on a physical device, however. For example, "print to email" services allow a user to use print functionality in their applications to generate a PDF-formatted document of application output and attach it to a new email in an email application or service—no physical printed document is typically output by a physical printer as a direct result of a "print to email" operation.

Additional cloud-based services may also be applied in combination with print services (or generically, "device services"), including without limitation intelligent routing, remote printing of held jobs, printer supply management, and document format transformation. Moreover, cloud device virtualization can route and store device-destined data according to enterprise and/or government data storage requirements. For example, a cloud-based device service computing system can be configured to ensure that incoming data is stored in a compliant storage system to satisfy enterprise and/or governmental compliance (e.g., GDPR). Accordingly, some implementations of cloud device virtualization can provide security benefits. For example, a cloud-based printer service computing system can manage individual printer certificates and ensure that the certificate lifecycle is tied to that of the cloud-based printer service.

In addition, by virtualizing a device endpoint using a virtual device object stored in a cloud-based device service, an administrator can configure the virtual device object to securely handle access requests (e.g., print requests) of multiple users with a level of independence as to the device endpoint or endpoints that actually serve the requests. For example, if a user requests printing of a document and the user's regular printer is out of service, the administrator, associated policies, or a machine learning agent can re-configure the virtual device object to route the print job to a different printer endpoint where the printer job can be completed.

Figure 1:
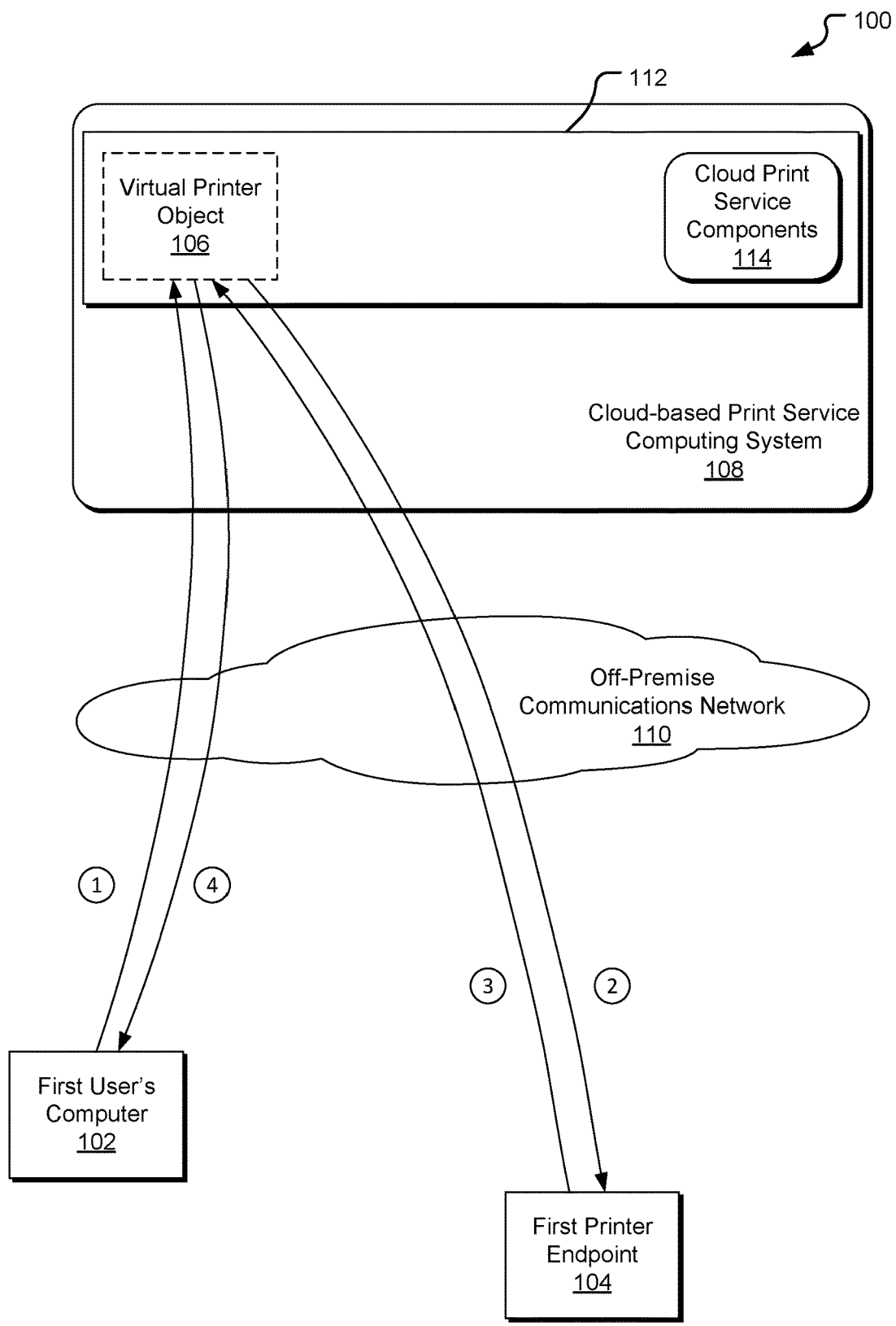
FIG. 1 illustrates an example system providing access by a first user's computer to a first printer endpoint via a virtual printer object recorded in a cloud-based print service computing system.

FIG. 1 illustrates an example system 100 providing access by a first user's computer 102 to a first printer endpoint 104 via a virtual printer object 106 recorded in a cloud-based print service computing system 108. The first user's computer 102 and the first printer endpoint 104 are configured to communicate with the cloud-based print service computing system 108 via an off-premise communications network 110, such as the Internet. More generally, an "off-premise communications network" is a communications network outside the enterprise's physical and/or logical security control. It should be understood that the printer examples described herein are specific implementations of the described technology and that cloud-based device services for interacting with device endpoints other than printers are contemplated, including proxy servers, internet-of-things (IoT) devices, industrial sensors and controllers, mobile devices, storage systems, and networking equipment.

The cloud-based print service computing system 108 includes one or more physical and/or virtual computing systems. In one implementation, such computing systems are distributed throughout one or more datacenters, although other configurations are contemplated. The cloud-based print service computing system 108 includes memory 112 storing one or more cloud print service components 114 (e.g., a registration service, a notification manager, a print manager, a discovery service, an access manager, an identity manager, a transformation service). Such components can execute operations for registering printer endpoints with the cloud-based print service computing system 108, creating and managing virtual printer objects, validating the identity of printer endpoints, determining access authorization and limits (such as based on administration parameters and user credentials), managing print requests and print jobs, discovering printer endpoints that are available to users, and other operations.

In one implementation, each virtual printer object (generically, a "virtual device object"), such as the virtual printer object 106, stores a virtual device identifier (e.g., a globally unique identifier or GUID) and a secure device endpoint identifier (e.g., another GUID) associated with a printer endpoint, such as the first printer endpoint 104. In one implementation, a secure device endpoint identifier is derived from and backed by a certificate (e.g., an x.509 certificate), although other techniques for securing a device endpoint identifier may be employed. The virtual printer object may also store other data relevant to operation and management of the printer endpoint. For example, the virtual printer object 106 is created through a registration operation and stores a virtual device identifier, a secure device endpoint identifier, a printer queue object, one or more printer attributes, and one or more printer access control parameters associated with the first printer endpoint 104.

When the first printer endpoint 104 registers with the cloud-based print service computing system 108, the cloud-based print service computing system 108 creates the virtual printer object 106 in association with the first printer endpoint 104, stores a secure device endpoint identifier and a virtual device identifier for the first printer endpoint 104 in the virtual printer object 106, and configures the virtual printer object 106 to receive print requests based on the virtual device identifier and to execute the resulting print jobs based on the secure device endpoint identifier.

The first user's computer 102 discovered the first printer endpoint 104 through a discovery process that returned the virtual device identifier of the first printer endpoint 204. Therefore, print requests to the first printer endpoint 104 by the first user's computer 102 include the virtual device identifier of the first printer endpoint 104. In another implementation, creation of the virtual printer object 106 can be delayed until an administrator configurates the first printer endpoint 104 as a virtualized printer endpoint.

Accordingly, once the first printer endpoint is registered with the cloud-based print service computing system 108, authorized users can discover the first printer endpoint 104 and issue print requests based on the virtual device identifier associated with the first printer endpoint 104. In response to such requests, the corresponding print job is allocated to the first printer endpoint 104 based on the secure device endpoint identifier.

With reference to the communication sequence numbers (i.e., the digits in the circles) shown in FIG. 1, a print request specifying the virtual device identifier of the first printer endpoint 104 is sent to the cloud-based print service computing system 108 in communication 1. By virtue of the mapping between the virtual device identifier and the secure device endpoint identifier in the virtual printer object 106, the cloud-based print service computing system 108 allocates the requested print job to the first printer endpoint 104 based on the secure device endpoint identifier in a communication 2. The first printer endpoint 104 attempts to execute the received print job and returns a print result associated with its secure device endpoint identifier in a communication 3. The cloud-based print service computing system 108 uses the mapping in the virtual printer object 106 to return a print result associated with the corresponding virtual device identifier in a communication 4.

Figure 2:
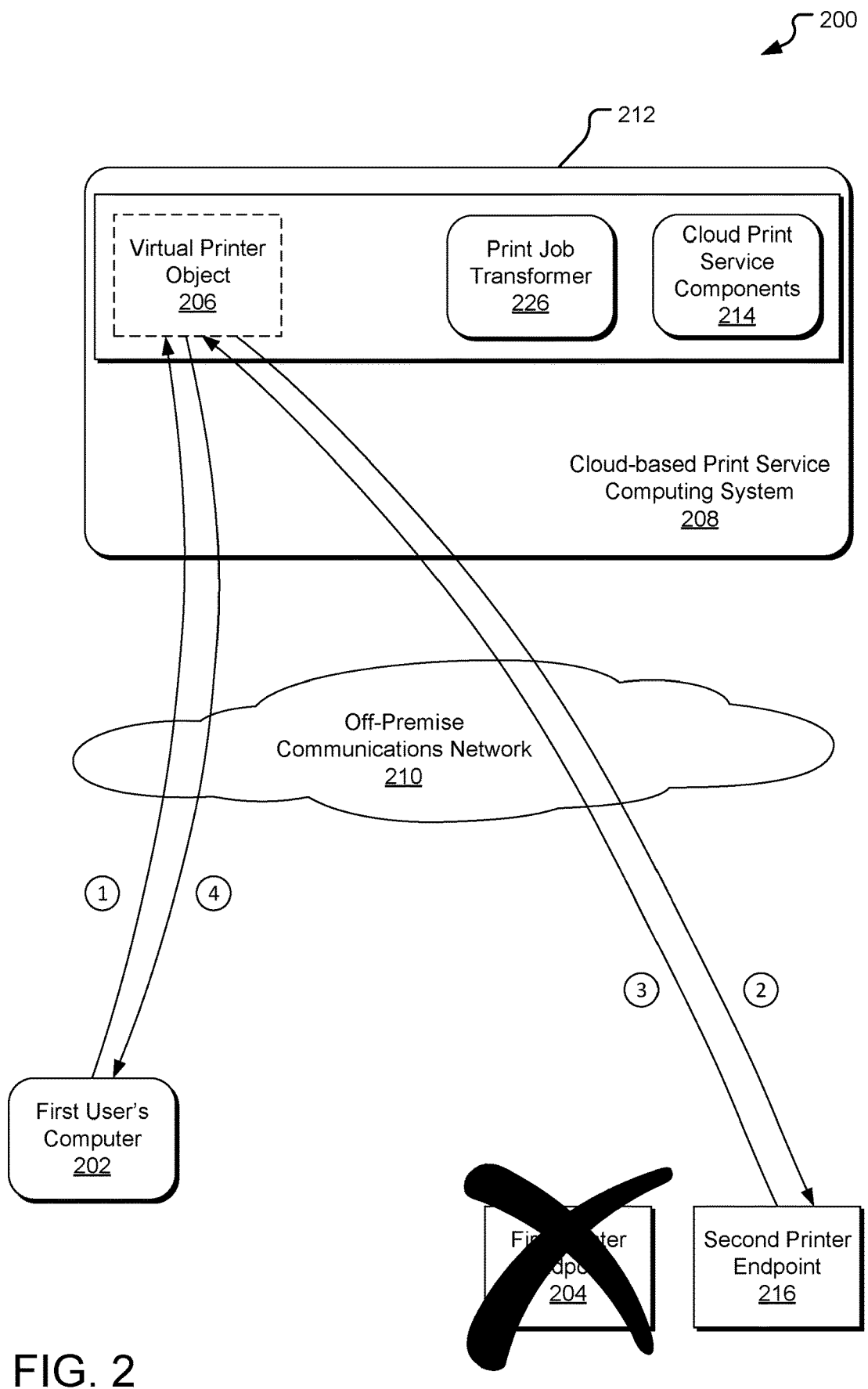
FIG. 2 illustrates an example system providing by access a first user's computer to a second printer endpoint via a virtual printer object recorded in a cloud-based print service computing system.

FIG. 2 illustrates an example system 200 providing by access a first user's computer 202 to a second printer endpoint 216 via a virtual printer object 206 recorded in a cloud-based print service computing system 208. The first user's computer 202 and the first printer endpoint 204 are configured to communicate with the cloud-based print service computing system 208 via an off-premise communications network 210, such as the Internet.

The cloud-based print service computing system 208 includes one or more physical and/or virtual computing systems. In one implementation, such computing systems are distributed throughout one or more datacenters, although other configurations are contemplated. The cloud-based print service computing system 208 includes memory 212 storing one or more cloud print service components 214 (e.g., a registration service, a notification manager, a print manager, a discovery service, an access manager, an identity manager, a transformation service). Such components can execute operations for registering printer endpoints with the cloud-based print service computing system 208, creating and managing virtual printer objects, validating the identity of printer endpoints, determining access authorization and limits (such as based on administration parameters and user credentials), managing print requests and print jobs, discovering printer endpoints that are available to users, and other operations.

The first user's computer 202 discovered the first printer endpoint 204 through a discovery process that returned the virtual device identifier of the first printer endpoint 204. Therefore, print requests to the first printer endpoint 204 by the first user's computer 202 include the virtual device identifier of the first printer endpoint 204. In this manner, multiple client devices can issue print requests using the virtual device identifier stored in the virtual printer object 206.

As shown in FIG. 2, the first user's computer 202 sends a print request to the cloud-based print service computing system 208 based on the virtual device identifier of the first printer endpoint 204. However, as shown, the first printer endpoint 204 is unavailable (e.g., under repair, off-line, non-functional). Accordingly, the cloud-based print service computing system 208 modifies the virtual printer object 206 to map the virtual device identifier in the virtual printer object 206 to the secure device endpoint identifier of the second printer endpoint 216.

With reference to the communication sequence numbers (i.e., the digits in the circles) shown in FIG. 2, a print request specifying the virtual device identifier of the first printer endpoint 204 is sent to the cloud-based print service computing system 208 in communication 1. By virtue of the modified mapping between the virtual device identifier and the secure device endpoint identifier in the virtual printer object 206, the cloud-based print service computing system 208 allocates the requested print job to the second printer endpoint 216, rather than the first printer endpoint 204, based on the modified secure device endpoint identifier, in a communication 2. The second printer endpoint 216 attempts to execute the received print job and returns a print result associated with its secure device endpoint identifier in a communication 3. The cloud-based print service computing system 208 uses the mapping in the virtual printer object 206 to return a print result associated with the corresponding virtual device identifier in a communication 4.

In some implementations, replacing the first printer endpoint 204 with the second printer endpoint 216 to service the print request may involve certain transformations of the print request, the document to be printed, or the parameters associated with the print job. For example, an A4 paper tray in the first printer endpoint 204, as specified in the print request, may be at a different location in the second printer endpoint 216. Alternatively, the second printer endpoint 216 may not have an A4 paper tray, and the print job may be modified, with or without user confirmation, to use a paper tray for a different size of paper.

In some scenarios, the first printer endpoint 204 and the second printer endpoint 216 have different and sometimes incompatible attributes. For example, the locations of the A4 sized paper trays in the devices may be different. Alternatively, the different attributes may present an incompatibility. For example, duplex printing was requested in the print job to the first printer endpoint 204, which supported duplex printing, whereas the second printer endpoint 216 does not support duplex printing. In one implementation, a print job transformer 226, a type of cloud print service component, can modify the attributes of the print job to adjust for the differences in the printer attributes (e.g., to make the print job compatible with the printer attributes of the second printer endpoint 216).

Figure 3:
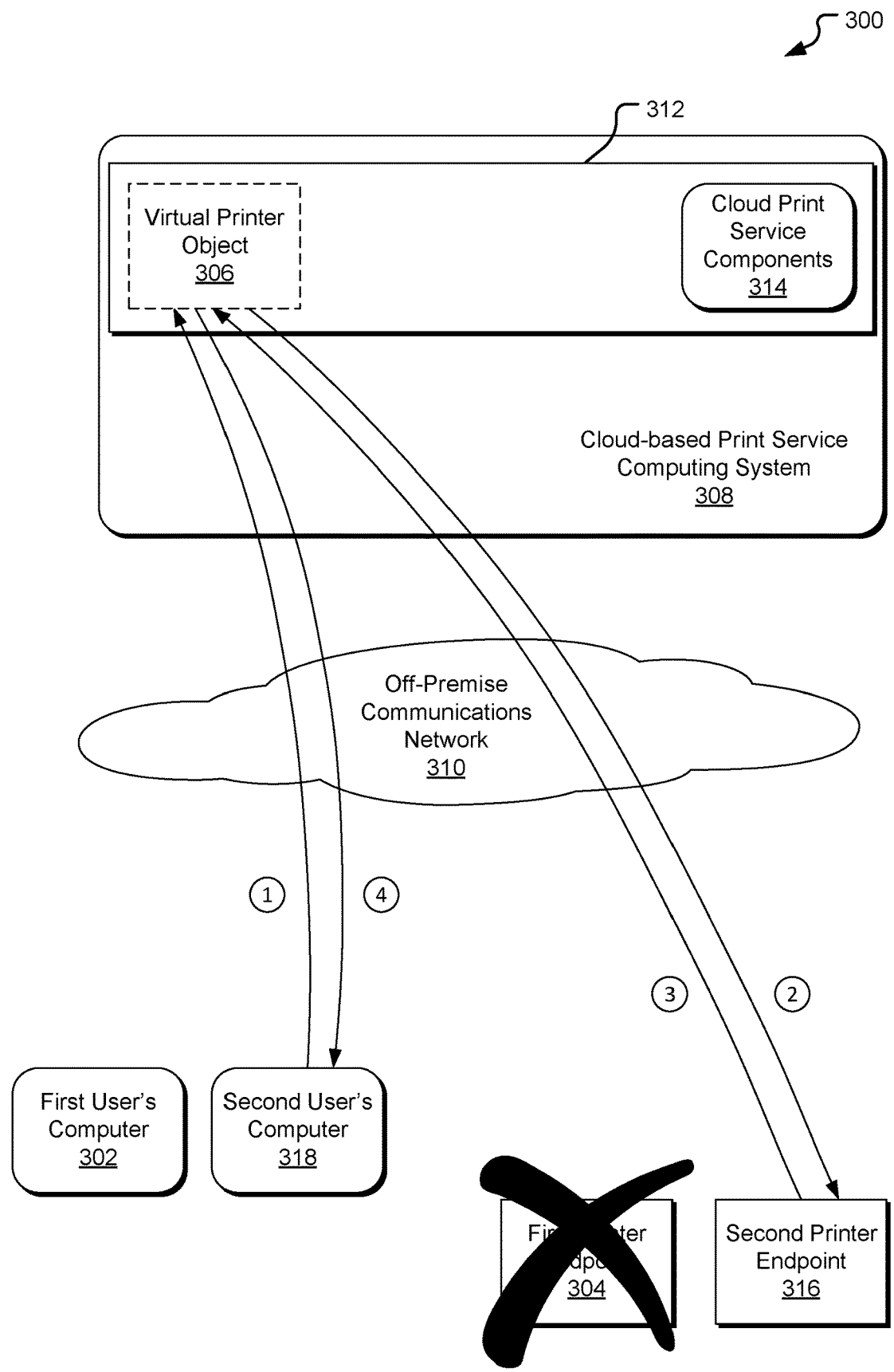
FIG. 3 illustrates an example system providing by access a second user's computer to a second printer endpoint via a virtual printer object recorded in a cloud-based print service computing system.

FIG. 3 illustrates an example system 300 providing by access a second user's computer 318 to a second printer endpoint 316 via a virtual printer object 306 recorded in a cloud-based print service computing system 308. A first user's computer 302, the second user's computer 318, and the first printer endpoint 304 are configured to communicate with the cloud-based print service computing system 308 via an off-premise communications network 310, such as the Internet.

The cloud-based print service computing system 308 includes one or more physical and/or virtual computing systems. In one implementation, such computing systems are distributed throughout one or more datacenters, although other configurations are contemplated. The cloud-based print service computing system 308 includes memory 312 storing one or more cloud print service components 314 (e.g., a registration service, a notification manager, a print manager, a discovery service, an access manager, an identity manager, a transformation service). Such components can execute operations for registering printer endpoints with the cloud-based print service computing system 308, creating and managing virtual printer objects, validating the identity of printer endpoints, determining access authorization and limits (such as based on administration parameters and user credentials), managing print requests and print jobs, discovering printer endpoints that are available to users, and other operations.

The first user's computer 302 and the second user's computer 318 discovered the first printer endpoint 304 through a discovery process that returned the virtual device identifier of the first printer endpoint 304. Therefore, print requests to the first printer endpoint 304 by the first user's computer 302 and the second user's computer 318 include the virtual device identifier of the first printer endpoint 304. In this manner, multiple client devices can issue print requests using the virtual device identifier stored in the virtual printer object 306.

As shown in FIG. 3, the second user's computer 318 sends a print request to the cloud-based print service computing system 308 based on the virtual device identifier of the first printer endpoint 304. However, as shown, the first printer endpoint 304 is unavailable (e.g., under repair, off-line, non-functional). Accordingly, the cloud-based print service computing system 308 modifies the virtual printer object 306 to map the virtual device identifier in the virtual printer object 306 to the secure device endpoint identifier of the second printer endpoint 316.

With reference to the communication sequence numbers (i.e., the digits in the circles) shown in FIG. 3, a print request specifying the virtual device identifier of the first printer endpoint 304 is sent to the cloud-based print service computing system 308 in communication 1. By virtue of the modified mapping between the virtual device identifier and the secure device endpoint identifier in the virtual printer object 306, the cloud-based print service computing system 308 allocates the requested print job to the second printer endpoint 316, rather than the first printer endpoint 304, based on the modified secure device endpoint identifier, in a communication 2. The second printer endpoint 316 attempts to render (e.g., print) the received print job and returns a print result associated with its secure device endpoint identifier in a communication 3. The cloud-based print service computing system 308 uses the mapping in the virtual printer object 306 to return a print result associated with the corresponding virtual device identifier in a communication 4. In some implementations, replacing the first printer endpoint 304 with the second printer endpoint 316 to service the print request may involve certain transformations of the print request, the document to be printed, or the parameters associated with the print job.

Figure 4:
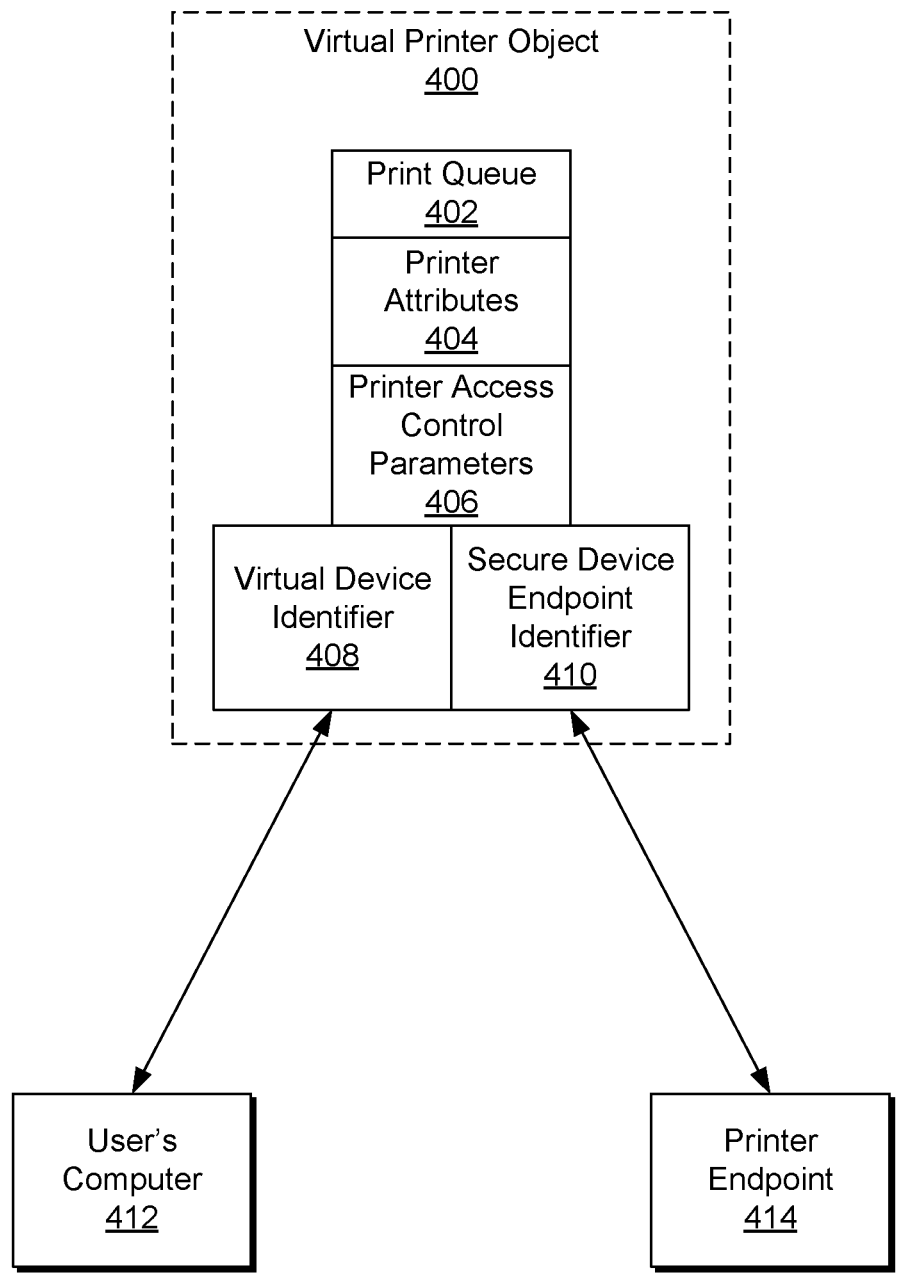
FIG. 4 illustrates an example virtual printer object.

FIG. 4 illustrates an example virtual printer object 400. The example virtual printer object 400 is an example of a virtual device object and includes data structures for a print queue 402, one or more printer attributes 404, one or more printer access control parameters 406, a virtual device identifier 408, and a secure device endpoint identifier 410. The print queue 402 may list of printer output jobs held in a reserved memory area and maintain the current status of active and pending print requests and print jobs.

The print queue 402 may also include storage for cached (e.g., held) print jobs and requests. For example, a secure device endpoint identifier in a virtual printer object may be removed and replaced with a secure device endpoint identifier of a different device endpoint. Accordingly, if a print request is sent to a virtual device identifier that does not have a secure device endpoint identifier associated with the virtual device identifier, the print request and/or the resulting print job may be cached in the virtual printer object until a secure device endpoint identifier is stored in the virtual printer object. When a secure device endpoint identifier is available in the virtual printer object, the print job can then be notified to the corresponding printer endpoint and rendered.

Caches, which can be implemented in memory and/or storage (collectively referred to as "system memory"), may be used for a variety of purposes. In one implementation, the print request can be transmitted to the cloud-based printer service computing system, the resulting print job can be created and then cached in system memory until it can be transmitted to the destination printer endpoint (e.g., until the destination printer endpoint is available). Even then, the cached print job may remain cached until the print job is completed and/or until a print-job-complete acknowledgment is received. In another implementation, a print job can be cached until the destination printer (or an authorized and authenticated application, such as a mobile app) releases the print job from the cache for transmission to and rendering by the destination printer. Caches, whether in a user's computing system, the cloud-based printer service computing system, or a printer endpoint, may be used for other purposes, including without limitation caching print requests until the user is connected to the cloud-based printer service computing system and retaining printer requests and/or printer jobs for compliance reasons.

As used herein, a print request represents a request to print a document and includes or references a virtual device identifier of the target printer endpoint, and a print job represents an instruction to print the document and includes or references a secure device endpoint identifier of the target printer endpoint. The printer attributes 404 include parameters designating without limitation one or more of printer capabilities (e.g., black and white, color, duplex), printer configuration (e.g., printer location, A4 paper tray), and printer supplies (e.g., the remaining amount of black ink). The printer access control parameters 406 include parameters relating to without limitation access control lists, access privileges, access constraints, credentials, and roles of users, organization, and administrators.

The virtual printer object 400 also provides a mapping between the virtual device identifier 408, by which a user's computer 412 requests a printing operation, and a secure device endpoint identifier 410, by which a print service communicates with the printer endpoint 414 to render a requested print job. If the print service determines that the printer endpoint 414 is not available, the print service can replace the value of the secure device endpoint identifier 410 with that of another, available printer endpoint so that print requests to the virtual device identifier 408 may still be serviced.

Other implementations of a virtual device object may include data structures for a secure device endpoint identifier, a virtual device identifier, and other parameters, structures, and functions relevant to the type of device being virtualized in the cloud-based service. Furthermore, different varieties of virtual device objects may be employed within the same cloud-based service. For example, a single cloud-based service may manage virtual device objects for printers, scanners, fax machines, telephones, security devices, etc.

Figure 5:
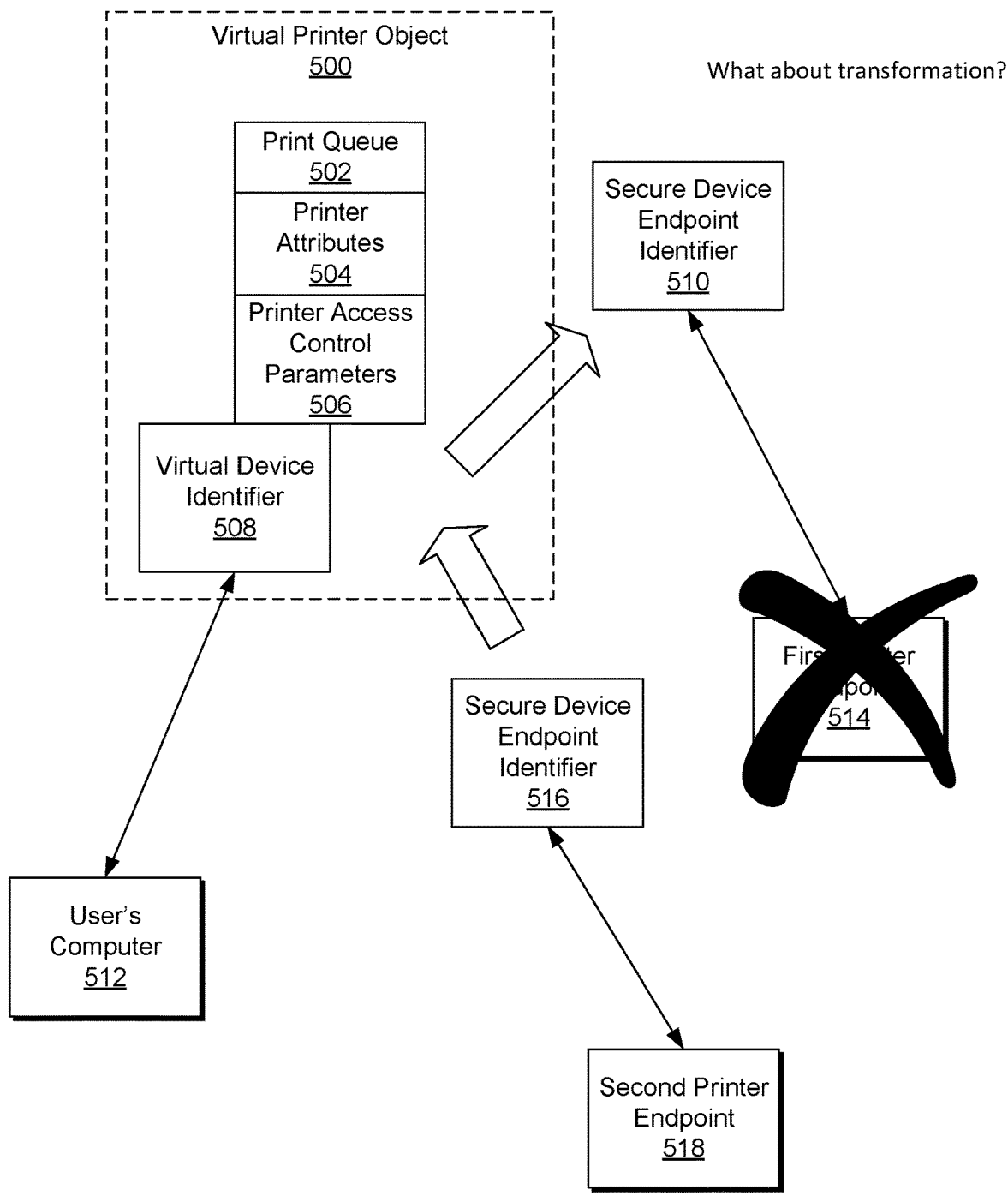
FIG. 5 illustrates an example virtual printer object replacing a secure device endpoint identifier of a first printer endpoint with a secure device endpoint identifier of a second printer endpoint.

FIG. 5 illustrates an example virtual printer object 500 replacing a secure device endpoint identifier of a first printer endpoint with a secure device endpoint identifier of a second printer endpoint. The example virtual printer object 500 is an example of a virtual device object and includes data structures for a print queue 502, one or more printer attributes 504, one or more printer access control parameters 506, a virtual device identifier 508, and a secure device endpoint identifier 510. The print queue 502 may list of printer output jobs held in a reserved memory area and maintain the current status of active and pending print requests and print jobs. Held print jobs lack an assignment to an identified physical printer under a user or process selects the held print job and assignment a physical printer to the print job.

As used herein, a print request represents a request to print a document and includes or references a virtual device identifier of the target printer endpoint, and a print job represents an instruction to print the document and includes or references a secure device endpoint identifier of the target printer endpoint. The printer attributes 504 include parameters relating to without limitation one or more of printer capabilities (e.g., black and white, color, duplex), printer configuration (e.g., printer location, A4 paper tray), and printer supplies (e.g., the remaining amount of black ink). The printer access control parameters 506 include parameters relating to without limitation access control lists, access privileges, access constraints, credentials, and roles of users, organization, and administrators.

The virtual printer object 500 also provides a mapping between the virtual device identifier 508, by which a user's computer 512 requests a printing operation, and a secure device endpoint identifier 510, by which a print service communicates with the first printer endpoint 514 to render a requested print job. If the print service determines that the first printer endpoint 514 is not available (as shown by the large dark X), the print service can replace the value of the secure device endpoint identifier 510 with that of another, available printer endpoint so that print requests to the virtual device identifier 508 may still be serviced.

The remapping of virtual device identifiers to different secure device endpoint identifiers may be performed by explicit administrator instructions, organization policies, or machine learning agents in the cloud-based print service computing system. In the example illustrated in FIG. 5, the secure device endpoint identifier 510 in the virtual printer object 500 is replaced with a secure device endpoint identifier 516 to a second printer endpoint 518 during scheduled system maintenance and, in this case, was initiated by administrator instruction. Accordingly, print jobs directed to the virtual device identifier 508 are now directed to the second printer endpoint 518. In addition, although not illustrated in FIG. 5, the printer attributes 504 and the printer access control parameters 506 can be updated to those of the second printer endpoint 518.

In some scenarios, the first printer endpoint 514 and the second printer endpoint 518 have different and sometimes incompatible attributes. For example, the locations of the A4 sized paper trays in the devices may be different. Alternatively, the different attributes may present an incompatibility. For example, duplex printing was requested in the print job to the first printer endpoint 514, which supported duplex printing, whereas the second printer endpoint 518 does not support duplex printing. In one implementation, a print job transformer (not shown), a type of cloud print service component, can modify the attributes of the print job to adjust for the differences in the printer attributes.

In one implementation, the print job transformer can determine or detect such differences and/or incompatibilities and modify the attributes of the print job to adjust for the differences in the printer attributes, such as by switching to single-sided printing. Furthermore, the print job transformer may present a user interface to the user's computer that prompts the user to make decisions about the transformation (e.g., rather than single-sided printing, hold the print job until another printer is available that supports duplex printing; redirect the print job to a printer associated with a different virtual device identifier).

Figure 6:
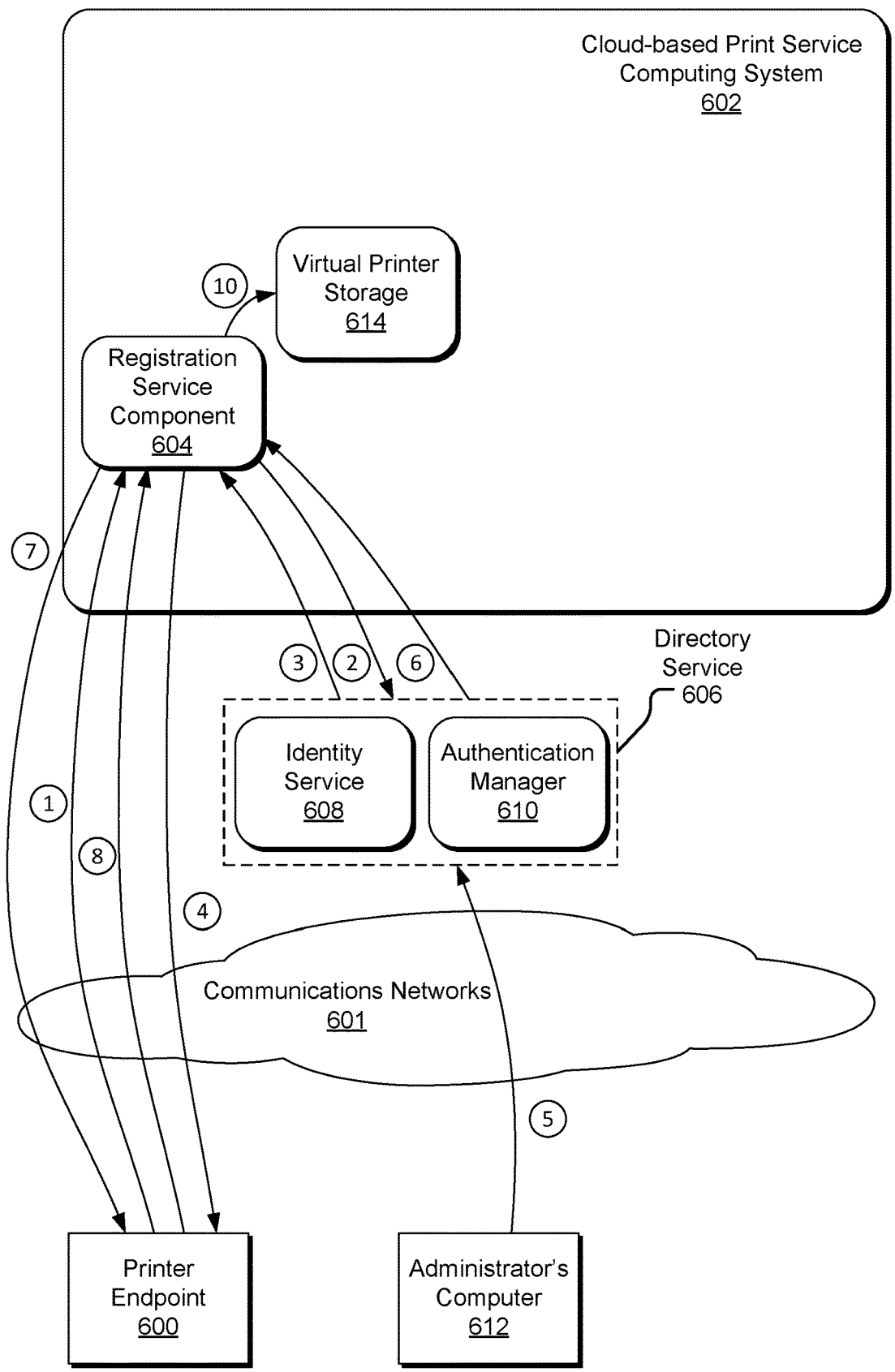
FIG. 6 illustrates example registration of a printer endpoint in a cloud-based print service.

FIG. 6 illustrates example authentication of a printer endpoint 600 in a cloud-based print service computing system 602. In a typical scenario, an administrator would initiate registration through a user interface on the printer endpoint 600, such as through an touchscreen display and/or keyboard of the printer endpoint 600, although such configuration may be accomplished through other support interfaces, including without limitation a connector device physically connected to the printer endpoint 600 or a secure remote wireless connection with the administrator's mobile device.

With reference to the communication sequence numbers (i.e., the digits in the circles) shown in FIG. 6, the administrator can instruct the printer endpoint 600 to register with the cloud-based print service computing system 602 under certain constraints (e.g., as governed by organizational policies, subject to user credentials). Responsive to the instruction, the printer endpoint 600 (or another support interface) opens a secure network connection to a registration service component 604 of the cloud-based print service computing system 602 and request registration via a communication 1. Communication between the printer endpoint 600 and the cloud-based print service computing system 602 are connected through an off-premise communications network of the communications networks 601, whereas communications between the printer endpoint 600 and the directory service 606 may be connected through an on-premise or off-premise communications network of the communications networks 601.

Responsive to the registration request, the registration service component 604 communicates in a communication 2 with a directory service 606 for managing devices on a network. In one implementation, the communication 2 employs the OAuth for Devices protocol. The directory service 606 shown in FIG. 6 provides a multi-tenant, cloud-based identity and authentication management service, including an identity service 608 and an authentication manager 610, although other directory services may be employed. The identity service 608 can return authentication tokens (e.g., as represented by a 10-digit code, a QR code, or another code format) and authenticate identities of users and devices. The authentication manager 610 defines the level of access the user or device is granted within the cloud-based print service computing system 602 based on the rights assigned to the authenticated user or device (e.g., such as by administrative configuration or policy) and based on the permissions attached to the objects the user or device attempts to access. The directory service 606 responds to communication 2 by returning an authentication token (or code) in a communication 3, which the registration service component 604 then returns to the printer endpoint 600 in a communication 4, which presents the authentication token to the administrator (e.g., via an LCD screen, a printed page, a text message).

The administrator can then use another interface, such as the administrator's computer 612 (e.g., a workstation or mobile device), to submit the authentication token to the directory service 606 in a communication 5. In various implementations, this submission may be accomplished by typing in the 10-digit code or scanning the QR code with a camera. By this action, the administrator is claiming the device endpoint (i.e., the printer endpoint 600) associated with the authentication token.

Responsive to the administrator's claim, the directory service 606 determines the organization to which the administrator belongs evaluates the administrator's permissions for claiming the printer endpoint 600. The identity service 608 that attempts to validate the identities of both the administrator and the printer endpoint 600 and to evaluate the level of access available to both the administrator and the printer endpoint 600. The directory service 606 sends a secure device endpoint identity for the printer endpoint 600 via a communication 6 to the registration service component 604, if the claim is validated. For example, in one implementation, the directory service 606 sends a secure device endpoint identity derived from and backed by an x.509 certificate.

The registration service component 604 sends the secure device endpoint identifier to the printer endpoint 600 in a communication 7. The printer endpoint 600 makes a connection to the registration service component 602 in a communication 8 using the secure device endpoint identifier and waits for the administrator to complete the claiming procedure. Such communications may be performed via a secure communication connection, such as an SSL (Secure Sockets Layer) connection. At this state, the printer endpoint 600 has been assigned a secure device endpoint identifier representing its identity and identifying it as associated with the administrator's organization.

As part of the registration process, if the printer endpoint 600 is configured by the administrator to be virtualized, a virtual printer object is created in virtual printer storage 614 in communication 10. In one implementation, the virtual printer object includes a printer queue, one or more printer attributes, one or more printer access control parameters, the secure device endpoint identifier, and a corresponding virtual device identifier for the printer endpoint 600. In one implementation, communications between the cloud-based print service computing system 602 and the printer endpoint 600 are based on the secure device endpoint identifier, while users request printing services for the printer endpoint 600 based on the virtual device identifiers.

In one implementation, the creation of the virtual printer object includes allocating memory for the data structure and storing in the virtual printer object the secure device endpoint identifier, printer attributes, and the printer access control parameters. The printer access control parameters, in one implementation, record one or more users/groups allowed to access the associated printer endpoint, although other access control parameters and techniques may be employed. When the device endpoint is unregistered, the access control parameters are also deleted. In addition, after registration, the printer endpoint may be "shared" by an administrative action so that users can discover and use the printer endpoint via its virtual device identifier.

Figure 7:
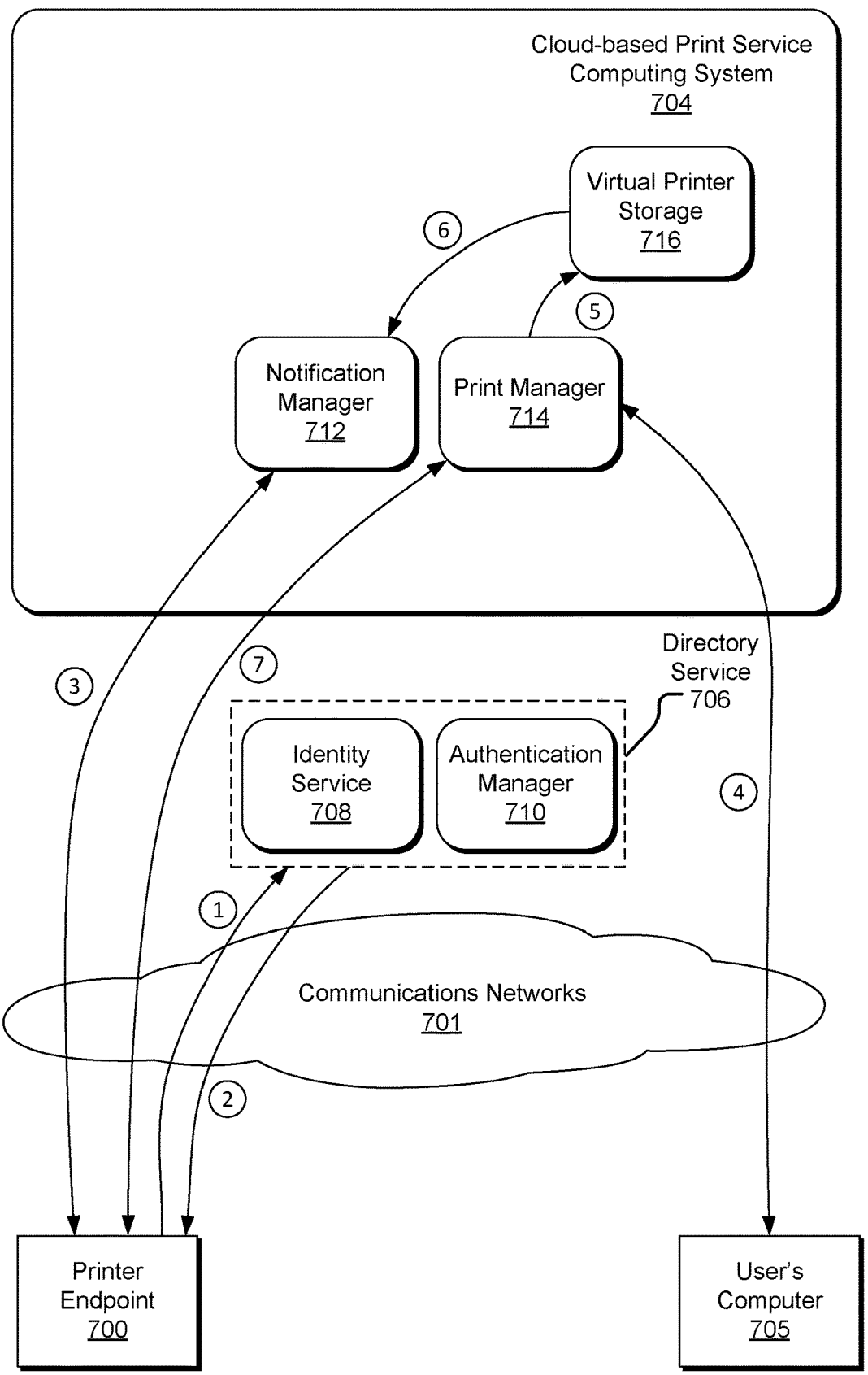
FIG. 7 illustrates an example login by a printer endpoint as a virtual printer to a cloud-based print service computing system.

FIG. 7 illustrates an example login by a printer endpoint 700 as a virtual printer to a cloud-based print service computing system 704. Having received a certificate-based identity during a registration operation, the printer endpoint 700 submits the identity to a directory service 706 to initiate a login operation in a communication 1. Communication between the printer endpoint 700 and the cloud-based print service computing system 704 are connected through an off-premise communications network of the communications networks 701, whereas communications between the printer endpoint 700 and the directory service 706 may be connected through an on-premise or off-premise communications network of the communications networks 701. If the directory service 706 validates the submitted identity, the directory service 706 returns an authentication token to the printer endpoint 700.

The directory service 706 shown in FIG. 7 includes an identity service 708 and an authentication manager 710, although other directory services may be employed. The identity service 708 can return authentication tokens and authenticate identities of users and devices. The authentication manager 710 defines the level of access the user or device is granted within the cloud-based print service computing system 704 based on the rights assigned to the authenticated user or device (e.g., such as by administrative configuration or policy) and based on the permissions attached to the objects the user or device attempts to access.

The printer endpoint 700 can then submit the authentication token to login to and poll a notification manager 712 in a communication 3. In one implementation, notifications are performed using a Printer Working Group (PWG) notification standard, although other notification protocols may be employed. If there are no print notifications for the printer endpoint 700, the printer endpoint 700 waits and polls again at a future time. The printer endpoint 700 may also provide the notification manager 712 with its status (e.g., online, offline, low supplies, jammed). When the user issues a print request targeting the printer endpoint 700 (e.g., from a user's computer 705) in a communication 4, the print manager 714 receives the request, which is targeting a printer endpoint 700 associated with a virtual device identifier provided with the request. The print manager 714 (or the notification manager 712) accesses (in a communication 5) a virtual printer object in the virtual printer storage 716 to obtain the corresponding secure device endpoint identifier of the printer endpoint 700 and sends the print job to the notification manager 712 in association with the secure device endpoint identifier in a communication 6. The printer endpoint 700, which is associated with the secure device endpoint identifier, learns of the print job availability through its polling of the notification manager 712 (again, communication 3) and issues a GET_JOB request to a print manager 714 in a communication 7.

Having obtained the print job from the print manager 714, the printer endpoint 700 executes the print job. The printer endpoint 700 may also communicate a print status or result back to the print manager 714, which can determine the corresponding virtual device identifier from the virtual printer object in the virtual printer storage 716 and then communicate the print job status back to the user's computing system (not shown).

Figure 8:
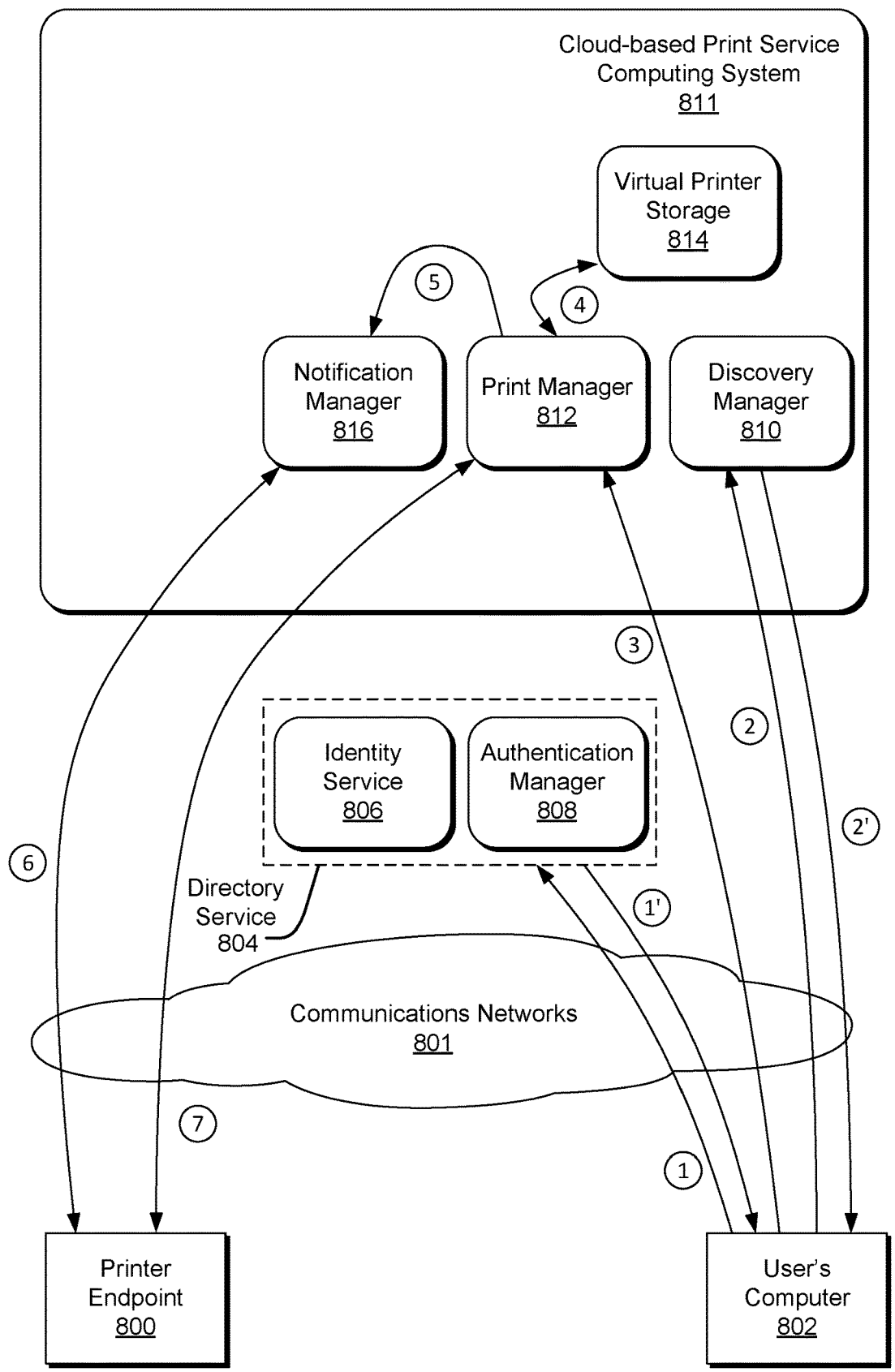
FIG. 8 illustrates example discovery of and printing through a virtual printer object to a printer endpoint.

FIG. 8 illustrates example discovery of and printing through a virtual printer object to a printer endpoint 800. A user's computer 802 connects to a directory service 804 in a communication 1. The directory service 804 includes an identity service 806 and an authentication manager 808. The user's computer 802 provides an identity to the directory service 804 and, if the provided identity can be validated by the directory service 804, the directory service 804 returns in a communication 1' a certificate-based secure identity to the user's computer 802. Communication between the printer endpoint 800 and the cloud-based print service computing system 811 are connected through an off-premise communications network of the communications networks 801, whereas communications between the user's computer 802 and the directory service 804 may be connected through an on-premise or off-premise communications network of the communications networks 801.

The user's computer 802 connects to the discovery manager 810 in a communication 2 to learn the virtual device identifier of a printer endpoint 800 to which the user has permission to access. The virtual device identifier is returned to the user's computer 802 in a communication 2'. The discovery manager 810 may also provide in the communication 2' other information to the user's computer 802, including without limitation printer location, printer capabilities, printer status, and printer supplies.

With the virtual device identifier of the printer endpoint 800, the user's computer 802 can request printing in a communication 3 to a print manager 812 (generically, a device access manager). In a communication 4, the print manager 812 reads the virtual printer object associated with the provided virtual device identifier from the virtual printer storage 814 and directs the print job to the notification manager 816 based on the corresponding secure device endpoint identifier.

The printer endpoint 800 has been polling the notification manager 816 for available print jobs and finds the print job sent by the print manager 812 for the corresponding secure device endpoint identifier in a communication 6. With the secure device endpoint identifier, the printer endpoint 800 reads the print job from the print manager 812 and executes the print job. The printer endpoint 800 may also communicate a print status or result back to the print manager 812, which can determine the corresponding virtual device identifier from the virtual printer object in the virtual printer storage 814 and then communicate the print job status back to the user's computing system 802.

Figure 9:
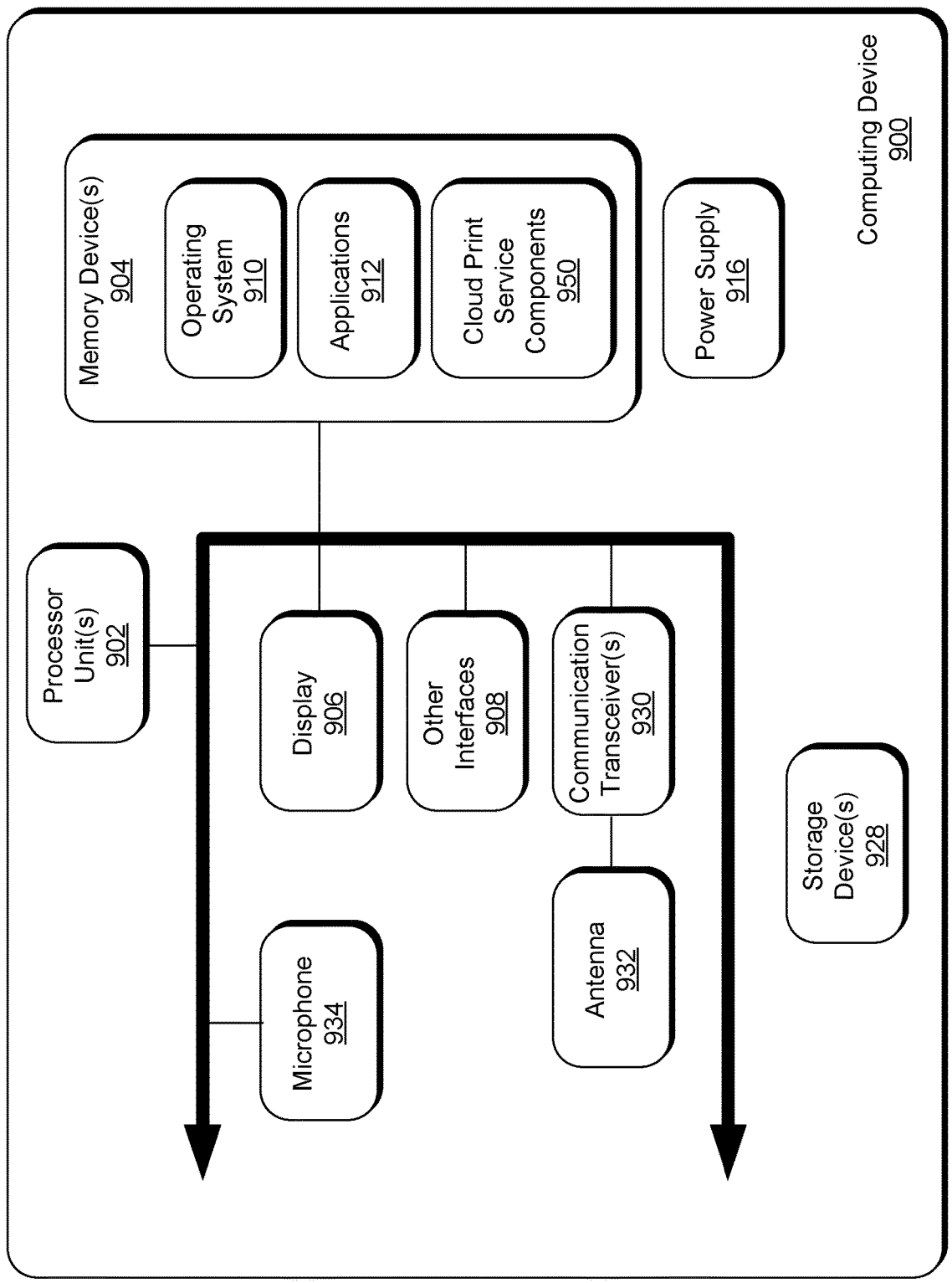
FIG. 9 illustrates an example computing device that may be useful in implementing the described technology to support cloud device virtualization.

FIG. 9 illustrates an example computing device that may be useful in implementing the described technology to support cloud device virtualization. The computing device 900 includes one or more processor units 902, one or more memory devices 904, a display 906 (e.g., a touchscreen display or lights), a microphone 934, and other interfaces 908 (e.g., buttons). The memory device(s) 904 generally includes either or both of volatile memory (e.g., RAM) and non-volatile memory (e.g., flash memory). An operating system 910, such as the Microsoft Windows® operating system or the Microsoft Windows® Mobile operating system, resides in the memory device(s) 904 and is executed by the processor unit(s) 902, although it should be understood that other operating systems may be employed.

One or more applications 912 may be loaded in the memory device(s) 904 and executed on the operating system 910 by the processor unit(s) 902. The computing device 900 includes a power supply 916, which is powered by one or more batteries or other power sources and which provides power to other components of the computing device 900. The power supply 916 may also be connected to an external power source that overrides or recharges the built-in batteries or other power sources.

The computing device 900 includes one or more communication transceivers 930 and an antenna 932 to provide network connectivity (e.g., a mobile phone network, Wi-Fi®, and BlueTooth®). The computing device 900 may also include various other components, such as a positioning system (e.g., a global positioning satellite transceiver), one or more accelerometers, one or more cameras, an audio interface (e.g., a microphone, an audio amplifier and speaker and/or audio jack), and one or more additional storage device(s) 928. Other configurations may also be employed.

In an example implementation, an operating system 910, various applications 912, cloud print service components 950, directory services, registration services, notification managers, print managers, discovery managers, and other modules and services may be embodied by instructions stored in the memory device(s) 904 and/or storage device(s) 928 and processed by the processing unit(s) 902. Print requests, print jobs, virtual printer objects, and other data may be stored in memory device(s) 904 and/or storage device(s) 928 as persistent datastores.

The computing device 900 may include a variety of tangible computer-readable storage media and intangible computer-readable communication signals, or alternatively, tangible processor-readable storage media and intangible processor-readable communication signals. Tangible computer-readable storage and tangible processor-readable storage can be embodied by any available media that can be accessed by the computing device 900 and includes both volatile and nonvolatile storage media, removable and non-removable storage media. Tangible computer-readable/processor-readable storage media excludes intangible communications signals (e.g., signals per se) and includes volatile and nonvolatile, removable and non-removable storage media implemented in any method or technology for storage of information such as computer/processor readable instructions, data structures, program modules or other data. Tangible computer-readable/processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. In contrast to tangible computer-readable/processor-readable storage media, intangible computer-readable/processor-readable communication signals may embody computer/processor readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible computer-readable/processor-readable storage medium to store logic. Examples of such a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer/processor program instructions may include any suitable type of code, such as source code, compiled code, interpreted code, executable code, static code, dynamic code, and the like. The executable computer program instructions may be implemented according to a predefined computer language, manner or syntax, for instructing a computer to perform a specific function. The instructions may be implemented using any suitable high-level, low-level, object-oriented, visual, compiled and/or interpreted programming language.

An example method of accessing a device endpoint through an off-premise communications network relative to the device endpoint includes registering the device endpoint to a virtual device object in data storage of a device service. The device service and the device endpoint communicate across the off-premise communications network. The virtual device object stories a secure device endpoint identifier of the device endpoint. A virtual device identifier associated with the secure device endpoint identifier of the device endpoint is stored in the virtual device object. A request to access the device endpoint using the virtual device identifier is received. The secure device endpoint identifier associated with the virtual device identifier in the virtual device object is read. The device endpoint of a pending job associated with the secure device endpoint identifier is notified. The pending job is communicated to the device endpoint identified by the secure device endpoint identifier.

Another example method of any preceding method is provided wherein the registering operation includes creating the virtual device object in the data storage, wherein the virtual device object is configured to associatively store the virtual device identifier and the secure device endpoint identifier.

Another example method of any preceding method is provided wherein the device endpoint is a printer endpoint, and the virtual device object includes a print queue for storing a list of active and pending print jobs directed to the secure device endpoint identifier in response to receipt of the request.

Another example method of any preceding method is provided wherein the device endpoint is a printer endpoint, and the virtual device object includes a printer attributes designating capabilities of the printer endpoint.

Another example method of any preceding method further includes storing in the virtual device object a different secure device endpoint identifier to a different device endpoint in associating with the virtual device identifier.

Another example method of any preceding method further includes receiving another request to access the device endpoint using the virtual device identifier, reading the different secure device endpoint identifier associated with the virtual device identifier in the virtual device object, notifying the different device endpoint of a pending job associated with the different secure device endpoint identifier, and communicating the pending job to the different device endpoint identified by the different secure device endpoint identifier.

Another example method of any preceding method is provided wherein the device endpoint is a printer endpoint and further includes determining that a pending print job is incompatible with printer attributes of the different device endpoint and transforming the pending print job to be compatible with the printer attributes of the different printer endpoint.

An example system for accessing a device endpoint through an off-premise communications network relative to the device endpoint includes a registration service configured to register the device endpoint to a virtual device object in data storage of a device service, the device service and the device endpoint communicating across the off-premise communications network. The virtual device object stories a secure device endpoint identifier of the device endpoint. Data storage is configured to store in the virtual device object a virtual device identifier associated with the secure device endpoint identifier of the device endpoint. A device access manager is coupled to the data storage and configured to receive a request to access the device endpoint using the virtual device identifier and to read the secure device endpoint identifier associated with the virtual device identifier in the virtual device object. A notification manager is coupled to the data storage and the device access manager and is configured to notify the device endpoint of a pending job associated with the secure device endpoint identifier and to communicate the pending job to the device endpoint identified by the secure device endpoint identifier.

Another example system of any preceding system is provided wherein the registering service is further configured to create the virtual device object in the data storage, wherein the virtual device object is configured to associatively store the virtual device identifier and the secure device endpoint identifier.

Another example system of any preceding system is provided wherein the device endpoint is a printer endpoint, and the virtual device object includes a print queue for storing a list of active and pending print jobs directed to the secure device endpoint identifier in response to receipt of the request.

Another example system of any preceding system is provided wherein the device endpoint is a printer endpoint, and the virtual device object includes a printer attributes designating capabilities of the printer endpoint.

Another example system of any preceding system is provided wherein the registration service is further configured to store in the virtual device object a different secure device endpoint identifier to a different printer endpoint in associating with the virtual device identifier.

Another example system of any preceding system is provided wherein the device access manager is further configured to receive another request to access the device endpoint using the virtual device identifier and to read the different secure device endpoint identifier associated with the virtual device identifier in the virtual device object, and to communicate the pending job to the different device endpoint identified by the different secure device endpoint identifier, and the notification manager is further configured to notify the different device endpoint of a pending job associated with the different secure device endpoint identifier.

Another example system of any preceding system is provided wherein the device endpoint is a printer endpoint and the example system further includes a print job transformer configured to determine that a pending print job is incompatible with printer attributes of the different device endpoint and to transform the print job to be compatible with the printer attributes of the different printer endpoint.

One or more example tangible processor-readable storage media of a tangible article of manufacture encoding processor-executable instructions for executing on an electronic computing system a process of accessing a device endpoint through an off-premise communications network relative to the device endpoint includes registering the device endpoint to a virtual device object in data storage of a device service, the device service and the device endpoint communicating across the off-premise communications network, the virtual device object storing a secure device endpoint identifier of the device endpoint. A virtual device identifier associated with the secure device endpoint identifier of the device endpoint is storing in the virtual device object. A request to access the device endpoint using the virtual device identifier is received. The secure device endpoint identifier associated with the virtual device identifier in the virtual device object is read. The device endpoint of a pending job associated with the secure device endpoint identifier is notified. The pending job is communicated to the device endpoint identified by the secure device endpoint identifier.

One or more other example tangible processor-readable storage media of any previous storage media is provided wherein the registering operation includes creating the virtual device object in the data storage, wherein the virtual device object is configured to associatively store the virtual device identifier and the secure device endpoint identifier.

One or more other example tangible processor-readable storage media of any previous storage media is provided wherein the device endpoint is a printer, and the virtual device object includes a print queue for storing a list of active and pending print jobs directed to the secure device endpoint identifier in response to receipt of the request.

One or more other example tangible processor-readable storage media of any previous storage media is provided wherein the process further includes storing in the virtual device object a different secure device endpoint identifier to a different device endpoint in associating with the virtual device identifier.

One or more other example tangible processor-readable storage media of any previous storage media is provided wherein the device endpoint is a printer endpoint, and the virtual device object includes a printer attributes designating capabilities of the printer endpoint, and wherein the process further includes receiving another request to access the device endpoint using the virtual device identifier, reading the different secure device endpoint identifier associated with the virtual device identifier in the virtual device object, notifying the different device endpoint of a pending job associated with the different secure device endpoint identifier, and communicating the pending job to the different device endpoint identified by the different secure device endpoint identifier.

One or more other example tangible processor-readable storage media of any previous storage media is provided wherein the process further includes determining that a pending print job is incompatible with printer attributes of the different device endpoint and transforming the pending print job to be compatible with the printer attributes of the different device endpoint.

An example system for accessing a device endpoint through an off-premise communications network relative to the device endpoint includes means for registering the device endpoint to a virtual device object in data storage of a device service. The device service and the device endpoint communicate across the off-premise communications network. The virtual device object stores a secure device endpoint identifier of the device endpoint. The example system further includes means for storing in the virtual device object a virtual device identifier associated with the secure device endpoint identifier of the device endpoint, means for receiving a request to access the device endpoint using the virtual device identifier, means for reading the secure device endpoint identifier associated with the virtual device identifier in the virtual device object, means for notifying the device endpoint of a pending job associated with the secure device endpoint identifier, and means for communicating the pending job to the device endpoint identified by the secure device endpoint identifier.

An example system of any preceding system is provided wherein the means for registering includes means for creating the virtual device object in the data storage, wherein the virtual device object is configured to associatively store the virtual device identifier and the secure device endpoint identifier.

An example system of any preceding system is provided wherein the device endpoint is a printer endpoint, and the virtual device object includes a print queue for storing a list of active and pending print jobs directed to the secure device endpoint identifier in response to receipt of the request.

An example system of any preceding system is provided wherein the device endpoint is a printer endpoint, and the virtual device object includes a printer attributes designating capabilities of the printer endpoint.

An example system of any preceding system further includes means for storing in the virtual device object a different secure device endpoint identifier to a different device endpoint in associating with the virtual device identifier.

An example system of any preceding system further includes means for receiving another request to access the device endpoint using the virtual device identifier, means for reading the different secure device endpoint identifier associated with the virtual device identifier in the virtual device object, means for notifying the different device endpoint of a pending job associated with the different secure device endpoint identifier, and means for communicating the pending job to the different device endpoint identified by the different secure device endpoint identifier.

An example system of any preceding system is provided wherein the device endpoint is a printer endpoint and the example system further includes means for determining that a pending print job is incompatible with printer attributes of the different device endpoint and means for transforming the pending print job to be compatible with the printer attributes of the different printer endpoint.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of accessing a plurality of validated device endpoints through an off-premise communications network, the method comprising:
    receiving a request that specifies a first validated device endpoint configured at a first location using a virtual device identifier stored in a virtual device object at a device service, wherein the device service communicates with the first validated device endpoint via the off-premise communication network;
    dynamically associating the virtual device identifier with a first secure device endpoint identifier using the virtual device object, the first secure device endpoint identifier uniquely identifying the first validated device endpoint among the plurality of validated device endpoints;
    determining that the first validated device endpoint specified in the request is unavailable;
    based on the first validated device endpoint specified in the request being unavailable, dynamically associating the virtual device identifier with a second secure device endpoint identifier using the virtual device object, the second secure device endpoint identifier uniquely identifying a second validated device endpoint among the plurality of validated device endpoints and the second validated device endpoint being configured at a second location that is different than the first location at which the first validated device endpoint is configured;
    reading the second secure device endpoint identifier associated with the virtual device identifier in the virtual device object; and
    communicating a pending job associated with the second secure device endpoint identifier to the second validated device endpoint.

2. The method of claim 1, further comprising creating the virtual device object in data storage of the device service.

3. The method of claim 1, wherein:
    each of the first validated device endpoint and the second validated device endpoint is a printer endpoint; and
    the virtual device object includes a print queue for storing a list of pending print jobs directed to the first secure device endpoint identifier or the second secure device endpoint identifier in response to receipt of the request.

4. The method of claim 1, wherein:
    each of the first validated device endpoint and the second validated device endpoint is a printer endpoint; and
    the virtual device object includes a printer attribute designating a capability of the first validated device endpoint or the second validated device endpoint.

5. The method of claim 1, wherein the second validated device endpoint is a printer endpoint and the method further comprises:
    determining that the pending job is incompatible with printer attributes of the printer endpoint; and
    transforming the pending job to be compatible with the printer attributes of the printer endpoint.

6. A system for accessing a plurality of validated device endpoints through an off-premise communications network, the system comprising:
    a hardware processor;
    computer storage media storing instructions that, when executed by the hardware processor, cause the system to:
        receive a request that specifies a first validated device endpoint configured at a first location using a virtual device identifier identifying a virtual device object at a device service, wherein the device service communicates with the first validated device endpoint via the off-premise communication network;

dynamically associate the virtual device identifier with a first secure device endpoint identifier using the virtual device object, the first secure device endpoint identifier uniquely identifying the first validated device endpoint among the plurality of validated device endpoints;

determine that the first validated device endpoint specified in the request is unavailable;

based on the first validated device endpoint specified in the request being unavailable, dynamically associate the virtual device identifier with a second secure device endpoint identifier using the virtual device object, the second secure device endpoint identifier uniquely identifying a second validated device endpoint among the plurality of validated device endpoints and the second validated device endpoint being configured at a second location that is different than the first location at which the first validated device endpoint is configured;

read second the secure device endpoint identifier associated with the virtual device identifier in the virtual device object; and communicate a pending job associated with the second secure device endpoint identifier to the second validated device endpoint.

7. The system of claim 6, wherein:

each of the first validated device endpoint and the second validated device endpoint is a printer endpoint; and the virtual device object includes a print queue for storing a list of pending print jobs directed to the first secure device endpoint identifier or the second secure device endpoint identifier in response to receipt of the request.

8. The system of claim 6, wherein:

each of the first validated device endpoint and the second validated device endpoint is a printer endpoint; and the virtual device object includes a printer attribute designating a capability of the first validated device endpoint or the second validated device endpoint.

9. A tangible processor-readable storage media device storing processor-executable instructions for accessing a plurality of validated device endpoints through an off-premise communications network, the processor-executable instructions, when executed by at least one processor, causing a system to perform operations comprising:

receiving a request that specifies a first validated device endpoint configured at a first location using a virtual device identifier stored in a virtual device object at a device service, wherein the device service communicates with the first validated device endpoint via the off-premise communication network;

dynamically associating the virtual device identifier with a first secure device endpoint identifier using the virtual device object, the first secure device endpoint identifier uniquely identifying the first validated device endpoint among the plurality of validated device endpoints;

determining that the first validated device endpoint specified in the request is unavailable;

based on the first validated device endpoint specified in the request being unavailable, dynamically associating the virtual device identifier with a second secure device endpoint identifier using the virtual device object, the second secure device endpoint identifier uniquely identifying a second validated device endpoint among the plurality of validated device endpoints and the second validated device endpoint being configured at a second location that is different than the first location at which the first validated device endpoint is configured;

reading the second secure device endpoint identifier associated with the virtual device identifier in the virtual device object;

notifying the second validated device endpoint of a pending job associated with the second secure device endpoint identifier; and communicating the pending job to the second validated device endpoint.

10. The tangible processor-readable storage media device of claim 9, wherein the operations further comprise creating the virtual device object in data storage of the device service.

11. The tangible processor-readable storage media device of claim 9, wherein:

each of the first validated device endpoint and the second validated device endpoint is a printer endpoint; and the virtual device object includes a print queue for storing a list of pending print jobs directed to the first secure device endpoint identifier or the second secure device endpoint identifier in response to receipt of the request.

* * * * *